United States Patent [19]

Davison

[11] Patent Number: 5,215,112
[45] Date of Patent: Jun. 1, 1993

[54] VALVE ACTUATOR LOCKING BRACKET
[75] Inventor: Michael P. Davison, Grand Haven, Mich.
[73] Assignee: Dyna-Torque Company, Inc., Muskegon, Mich.
[21] Appl. No.: 851,290
[22] Filed: Mar. 11, 1992
[51] Int. Cl.⁵ .................. F16K 35/00; F16K 35/10
[52] U.S. Cl. .................. 137/385; 70/177; 70/180; 70/212; 70/224; 248/552; 251/90; 251/95; 251/291
[58] Field of Search .............. 70/177, 178, 180, 212, 70/224; 137/385; 248/552; 251/89, 90, 95, 291, 292, 305

[56] References Cited

U.S. PATENT DOCUMENTS

| | | | |
|---|---|---|---|
| 1,432,621 | 10/1922 | Rath | 70/180 |
| 1,993,784 | 3/1935 | Henderson | 70/180 |
| 2,316,956 | 4/1943 | Heath | 70/180 |
| 2,390,972 | 12/1945 | Weinberg | 70/180 |
| 3,865,130 | 2/1975 | Mullis | 137/385 |
| 3,976,095 | 8/1976 | Koch et al. | 137/385 |
| 4,162,690 | 7/1979 | Anderson | 137/385 |
| 4,397,332 | 8/1983 | Sample | 137/385 |
| 4,498,320 | 2/1985 | Mullis | 70/177 |
| 5,058,622 | 10/1991 | Chitty, Jr. et al. | 137/385 |
| 5,139,041 | 8/1992 | Albrecht | 137/385 |

OTHER PUBLICATIONS

Drawing of Valve Actuator Locking Bracket.
"Mastergear" Drawing No. ME7054.
Direct Safety Company Catalog, Valve Lockout Covers, p. 33.

*Primary Examiner*—George L. Walton
*Attorney, Agent, or Firm*—Warner, Norcross & Judd

[57] ABSTRACT

A locking bracket for a valve actuator is disclosed in which a bracket element slips over the rotatable input shaft of the actuator and has an arm extending over the surface of the actuator. A locking plate is affixed to the input shaft which may be interconnected to the bracket element. When so interconnected, rotation of the input shaft is prevented by contact between the arm and the surface of the valve actuator. The locking bracket is easily and economically installed due to the lack of any positive physical interconnection between the bracket and the actuator housing.

20 Claims, 1 Drawing Sheet

VALVE ACTUATOR LOCKING BRACKET

BACKGROUND OF THE INVENTION

1. Field of the Invention

The present invention relates to valve locking devices and, more particularly, to a locking bracket for a valve actuator.

2. Description of the Related Art

It is common for pipeline valves to be constructed with an operating mechanism in which an input shaft must be rotated in order to open, close, or adjust the valve. A typical example is a pipeline flow control valve having a handwheel affixed to the input shaft of a valve actuator. To adjust the rate of fluid flow, the handwheel is rotated, thus also rotating the input shaft and causing the actuator mechanism of the valve to operate.

It is frequently desirable to provide a means for locking the operating mechanism of a valve so that the setting of the valve may not be easily disturbed, whether through mistake, inadvertence, or mischief. To this end, devices are available for attachment to a valve actuator that will lock the actuator and prevent or deter operation of the valve.

Heretofore, valve locking devices have necessitated the disassembly and reassembly of several components of the valve or the valve actuator. For example, a locking device is known in which the valve actuator from which the input shaft extends must be unbolted, a bracket is placed over the shaft, and the bracket is affixed to the actuator by replacing the bolt or bolts which were removed. The bracket and the handwheel each have a welded flange concentric with the drive shaft. The flanges have openings which are aligned with each other. A pin, bolt, or shackle is inserted through an aligned pair of openings of the two flanges.

Valve locking devices of the past have been subject to disadvantages in terms of the time, expense, and special skills required to affix the device to the valve. Accordingly, there is a heretofore unmet need for a valve locking device that is easily installed, requiring a minimum of disassembly and reassembly.

SUMMARY OF THE INVENTION

The present invention satisfies the aforementioned need by providing a valve actuator locking bracket which is installed by simply slipping the bracket component or components over the input shaft of the valve actuator. No positive interconnection between the bracket and the actuator housing is used; therefore, it is not necessary to assemble and reassemble any of the actuator components other than removal and replacement of the handwheel if one is initially present. No special tools or skills are required to install the bracket.

The valve actuator locking bracket of the invention is used on a valve actuator having an input shaft extending outwardly from an actuator housing, the housing having a surface disposed generally parallel to the axis of the input shaft. The locking bracket has a sleeve which slips over the input shaft. An arm is affixed to the sleeve and extends over the actuator housing surface in proximity to the housing surface. The input shaft is free to rotate within the bracket sleeve. However, the locking bracket is not free to rotate about the axis of the input shaft due to interfering contact between the bracket arm and the housing surface.

A bracket locking plate is affixed to the sleeve directed toward the end of the actuator shaft. The valve handwheel is affixed to the end of the input shaft for corotation with the input shaft, preferably by a bolt extending through coaligned holes in the handwheel hub and the input shaft. A handwheel locking plate is interposed between the handwheel hub and the bracket locking plate. The handwheel locking plate is affixed to the handwheel hub, preferably by the aforementioned bolt extending through ears extending from the handwheel locking plate having holes aligned with the handwheel and input shaft holes. The bracket locking plate and the handwheel locking plate are each formed with a plurality of openings.

With this arrangement, the handwheel locking plate rotates in conjunction with the handwheel and the input shaft. An opening in the handwheel locking plate may be aligned with an opening in the bracket locking plate. To lock the valve, a shackle or the like is inserted through a pair of aligned holes. Once locked, if an attempt is made to rotate the handwheel, the bracket arm will be made to contact the surface of the actuator housing. Rotation of the input shaft and operation of the valve will thus be arrested.

DESCRIPTION OF THE PREFERRED EMBODIMENT

Figure 1:
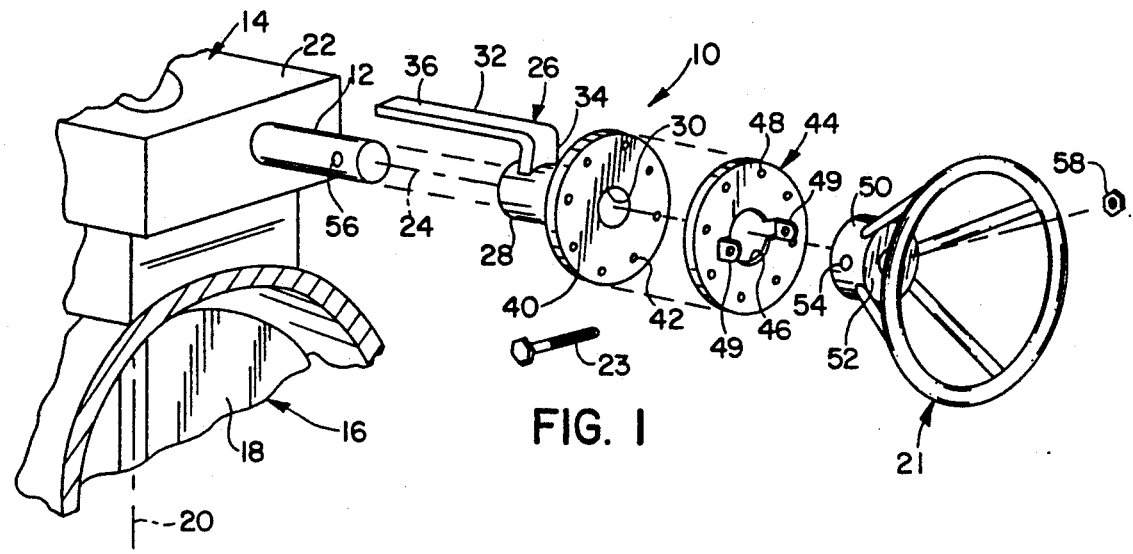
FIG. 1 is an exploded perspective view of the valve actuator locking bracket according to the principles of the invention.

By way of disclosing a preferred embodiment of the invention, and not by way of limitation, there is shown in the figures a locking bracket 10 adapted to be installed on the input shaft 12 of an actuator 14 for a valve 16. The valve is shown as a butterfly type valve having a circular plate 18 which is rotated about a vertical axis 20 in the interior of a pipeline. The plate is rotated by the internal mechanism of the actuator 14. Typically, the actuator will contain gearing for transmitting the rotation of the input shaft 12 to the plate 18. The input shaft 12 is rotated by means of a handwheel 21 which is affixed to the input shaft by means of a pin or bolt 23.

The valve 14 actuator may be any of a wide variety of types, shapes, and sizes. The bracket of the invention cooperates with the rotatable input shaft 12 of the actuator and an actuator housing having surface 22 disposed offset from and in nonperpendicular relationship with the axis 24 of rotation of the input shaft 12.

The locking device of the invention has a first component or bracket 26 which slips over the input shaft 12. The first component has a sleeve 28 formed with a cylindrical axial opening 30. The input shaft extends through the opening 30 with no positive interconnection between the sleeve and the input shaft. Thus, unless locked as described below, the shaft is free to rotate within the sleeve.

Figure 2:
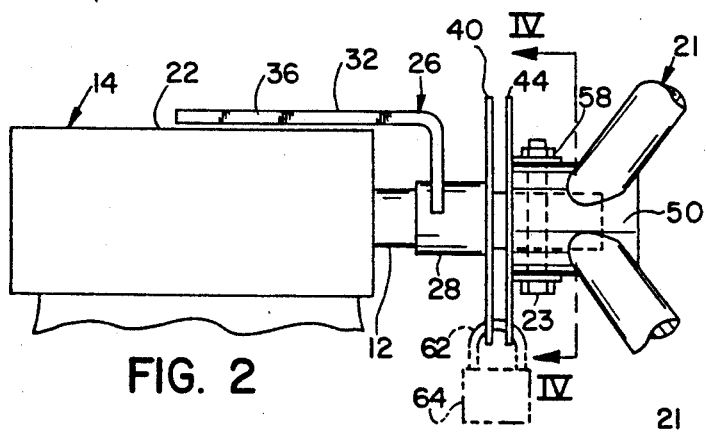
FIG. 2 is a side view of the locking bracket of FIG. 1 assembled to a valve actuator.
Figure 3:
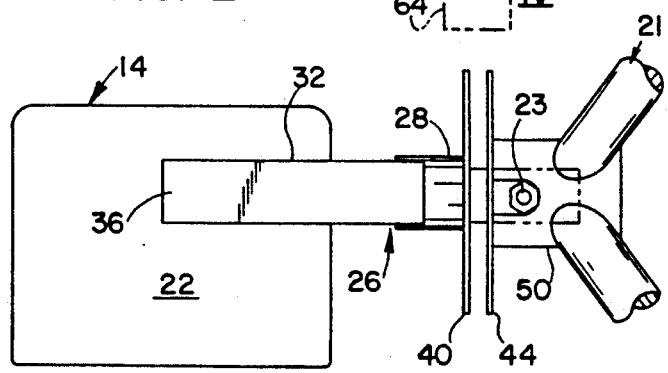
FIG. 3 is a top view of the locking bracket of FIG. 1.
Figure 4:
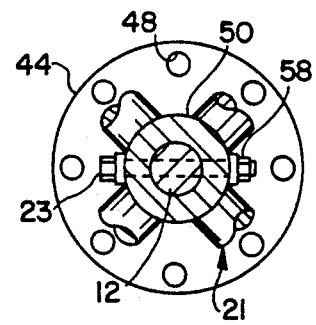
FIG. 4 is an end sectional view taken along the line IV—IV of FIG. 2.

An arm 32 extends from the sleeve toward the actuator 14. The arm is generally L-shaped, having a first leg 34 extending from the sleeve perpendicular to the axis 24, and a second leg 36 extending parallel to and offset from the axis 24. As shown in FIGS. 2 and 3, the second leg 36 extends over the actuator housing surface 22 generally parallel and in proximity to the surface 22. If an attempt is made to rotate the sleeve 28 about the axis of the input shaft 12, arm 36 will make contact with the actuator housing surface 22, thus preventing such rotation.

Bracket locking plate 40 is in the form of a circular flange affixed to the sleeve 28 at the end of the sleeve nearest the end of the input shaft. Bracket locking plate 40 is formed with a number of holes 42 formed at intervals along the periphery of the plate.

Handwheel locking plate 44 is in the form of a circular plate similar to locking plate 40. Handwheel locking plate 44 has a central opening 46 and a number of holes 48 formed at intervals along the periphery of the plate. Preferably, the central opening 46 has a diameter larger than the diameter of the input shaft 12 but smaller than the diameter of the hub 50 of the handwheel 21. Handwheel locking plate 44 is slipped over the input shaft 21 outwardly of the bracket locking plate 40 with the input shaft extending through the central opening 46. The handwheel locking plate is further formed with a pair of ears 49 formed at diametrically opposite extents of the central opening 46. The ears, which are formed to straddle the hub 50 of the handwheel 21, each include a hole directed toward the axis 24.

Handwheel 21 includes a central hub 50 formed with a central bore or opening 52 which slips over the end of the input shaft 12. The hub 50 is also formed with a transverse hole 54 adapted to be coaligned with a hole 56 formed transversely through the outer end of the input shaft 12. After the first bracket component 26 and handwheel locking plate 44 are slipped over the input shaft, the hub 50 is slipped over the input shaft outwardly of the handwheel locking plate. Hole 54 of the handwheel hub, the holes of the handwheel locking plate ears 49, and hole 56 of the input shaft are brought into coalignment. Bolt 23 is inserted through the coaligned holes and secured with nut 58. Thus, the handwheel locking plate 44 and handwheel 21 are interaffixed to the input shaft 12 for rotation in common with the input shaft.

Other means of affixing the handwheel locking plate to the handwheel hub are possible within the scope of the invention. For example, the handwheel locking plate may be welded to the handwheel hub.

With the bracket installed and unlocked as described above, the input shaft may be rotated by turning the handwheel. The input shaft may freely rotate within the sleeve 28.

As shown in FIG. 2, a connecting element such as the shackle 62 of a lock 64 may be inserted through coaligned holes 42, 48 of the bracket locking plate 40 and the handwheel locking plate 44. With the lock installed, rotational force applied to the handwheel 21 will be transmitted through the handwheel locking plate 44, shackle 62, bracket locking plate 40, sleeve 28, and arm 32. Leg 36 will then rotate slightly and contact the surface 22 of the actuator 14. This contact will prevent any substantial rotation of the handwheel and input shaft 12.

A lock 64 and shackle 62 are preferred for interaffixing the handwheel locking plate 44 and bracket locking plate 40 when a high degree of security is desired. Other interaffixing devices may be used, such as a bolt, pin, or tampering indicator inserted through the coaligned holes of the two plates.

Thus, the locking device of the invention requires no disassembly of the actuator other than removal of the handwheel if one is already attached. There is no physical interconnection between the bracket and the actuator, thus requiring no special attachment means on the actuator and making the device suitable and retrofittable to a wide variety of actuators.

The above description is that of a preferred embodiment of the invention. Various alterations and changes can be made without departing from the spirit and broader aspects of the invention as set forth in the appended claims, which are to be interpreted in accordance with the principles of patent law, including the Doctrine of Equivalents.

The embodiments of the invention in which an exclusive property or privilege is claimed are defined as follows:

1. A locking device for a valve actuator having a rotatable input shaft extending externally from a valve housing including an external valve housing surface disposed in an offset relationship to the input shaft, said locking device comprising:

a bracket means adapted for being removably carried on a portion of said input shaft with said input shaft freely rotatable with respect to said bracket means, said bracket means including an arm means extending in an unaffixed proximity to said surface and a first interconnection means;

a second interconnection means affixed to another portion of said input shaft for corotation therewith; and means for interconnecting said first interconnection means and said second interconnection means;

whereby when said first interconnection means and said second interconnection means are interconnected, rotation of said input shaft is prevented by contact between said arm means and said surface.

2. The locking device of claim 1 wherein said bracket means includes a sleeve adapted to be slipped over said input shaft.

3. The locking device of claim 2 wherein said arm means comprises an arm affixed to said sleeve and extending therefrom over said surface.

4. The locking device of claim 2 wherein said first interconnection means comprises a locking plate affixed to said sleeve, said locking plate formed with at least one opening for interconnection with a securing element.

5. The locking device of claim 4 wherein said second interconnection means comprises a locking plate formed with at least one opening for interconnection with said securing element.

6. The locking device of claim 1 wherein said valve actuator further means for rotating said input shaft, and wherein said second interconnection means is affixed for rotation with said means for rotating said input shaft.

7. The locking device of claim 6 wherein said input shaft, said means for rotating said input shaft, and said second interconnection means are formed with coaligned holes, and further comprising a pin means extending through said coaligned holes thereby securing said means for rotating said input shaft and said second means to said input shaft for rotation therewith.

8. A locking device for a valve actuator having a rotatable input shaft extending outwardly from a valve actuator housing, said actuator housing defining an external surface in nonperpendicular offset relationship to the axis of said input shaft, said locking device comprising:
- a removable bracket including a sleeve having a sleeve opening a portion of, said input shaft extending through said sleeve opening, said input shaft being freely rotatable with respect to said sleeve, said bracket further including an arm affixed to said sleeve and extending therefrom in overlying, proximate relationship with said surface, whereby substantial rotation of said bracket on said input shaft is prevented by interfering contact between said arm and said surface, said bracket further including a first locking means;
- a second locking means affixed to another portion of said input shaft for corotation therewith and disposed outwardly of said first locking means; and
- means for selectively interconnecting and disconnecting said first and second locking means;
- whereby substantial rotation of said input shaft is prevented when said first and second locking means are interconnected, and whereby substantial rotation of said input shaft is permitted when said first and second locking means are disconnected.

9. The locking device of claim 8 wherein said arm includes a first leg extending transversely from said sleeve and a second leg extending from said first leg across said surface.

10. The locking device of claim 8 wherein said first locking means comprises a first plate encircling said input shaft disposed outwardly of said sleeve, said plate formed with at least one hole.

11. The locking device of claim 10 wherein said second locking means comprises a second plate encircling said input shaft disposed outwardly of said first plate and formed with at least one hole alignable with said hole of said first plate, whereby an interconnection means may be inserted through and removed from the aligned holes for selectively interconnecting and disconnecting said first and second plates.

12. The locking device of claim 8, further comprising a handwheel means affixed to said input shaft disposed outwardly of said second locking means, said second locking means being affixed to said handwheel means.

13. The locking device of claim 12, wherein said handwheel means includes a central hub, and said second locking plate is affixed to said hub.

14. The locking device of claim 13, wherein said second locking means comprises a plate encircling said input shaft and including a pair of ears having holes formed therethrough, said hub and said input shaft each having holes formed therethrough, said holes of said ears, said hub, and said input shaft disposed in coalignment, and further comprising a pin means inserted through said coaligned holes.

15. The locking device of claim 8 wherein said first and second locking means each comprise a plate encircling said input shaft in confronting relationship with each other, each of said plates formed with a plurality of holes disposed at intervals about their peripheries, said holes being coalignable for the insertion and removal of a locking element.

16. A locking device for a valve actuator having a rotatable input shaft extending outwardly from a valve actuator housing, said housing having an external surface extending generally parallel to, but offset from, the axis of said input shaft, said locking device comprising;
- a removable bracket comprising a sleeve encircling said input shaft, said input shaft being freely rotatable with respect to said sleeve, said bracket further comprising an arm affixed to said sleeve and extending over said surface and proximate thereto whereby rotation of said bracket on said input shaft causes interfering contact between said arm and said surface, and a first locking plate affixed to said sleeve and encircling another portion of said input shaft disposed toward the free end of said input shaft;
- a wheel means affixed to the free end of said input shaft for causing said input shaft to rotate;
- a second locking plate encircling said input shaft affixed to at least one of either said input shaft and said wheel means, said second locking plate disposed between said first locking plate and said wheel means;
- means for selectively interconnecting and disconnecting said first and second locking plates whereby substantial rotation of said input shaft is prevented when said first and second locking plates are interconnected, and whereby substantial rotation of said input shaft is prevented when said first and second locking plates are disconnected.

17. The locking device of claim 16 wherein each of said first and second locking plates are formed with at least one hole alignable with the least one hole of the other plate, whereby a connecting element may be inserted through the aligned holes for locking said input shaft against substantial rotation.

18. The locking device of claim 17 wherein said wheel means includes a hub encircling said input shaft, and wherein said second locking plate is affixed to said hub.

19. The locking device of claim 18 wherein said second locking plate includes a pair of opposed ears straddling said hub.

20. The locking device of claim 19 further comprising coaligned holes formed through said ears, said hub, and said input shaft, and a pin means inserted through said coaligned holes thereby affixing said second locking plate and said wheel means for corotation with said input shaft.

* * * * *

UNITED STATES PATENT AND TRADEMARK OFFICE
CERTIFICATE OF CORRECTION

PATENT NO. : 5,215,112

DATED : June 1, 1993

INVENTOR(S) : Michael P. Davison

It is certified that error appears in the above-identified patent and that said Letters Patent is hereby corrected as shown below:

```
Column 5, claim 8, line 4:
  after "opening" insert --,--

Column 5, claim 8, line 4:
  after "of" delete --,--
```

Signed and Sealed this

Eleventh Day of January, 1994

Attest:

BRUCE LEHMAN

*Attesting Officer*  *Commissioner of Patents and Trademarks*